United States Patent
Hauck

(10) Patent No.: US 10,534,575 B1
(45) Date of Patent: Jan. 14, 2020

(54) BUFFERING OF ASSOCIATIVE OPERATIONS ON RANDOM MEMORY ADDRESSES

(71) Applicant: SAP SE, Walldorf (DE)

(72) Inventor: Matthias Hauck, Frankfurt (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/220,642

(22) Filed: Dec. 14, 2018

(51) Int. Cl.
G06F 5/00 (2006.01)
G06F 5/06 (2006.01)
G06F 12/0802 (2016.01)
G06F 9/38 (2018.01)

(52) U.S. Cl.
CPC ............... *G06F 5/06* (2013.01); *G06F 9/3814* (2013.01); *G06F 9/3832* (2013.01); *G06F 12/0802* (2013.01)

(58) Field of Classification Search
CPC ...... G06F 5/06; G06F 9/3832; G06F 12/0802; G06F 9/3814
See application file for complete search history.

(56) References Cited

U.S. PATENT DOCUMENTS

| | | | | |
|---|---|---|---|---|
| 5,761,706 A * | 6/1998 | Kessler | ............... | G06F 12/0862 |
| | | | | 711/118 |
| 8,117,395 B1 * | 2/2012 | Rohana | ............... | G06F 12/0864 |
| | | | | 711/128 |
| 2003/0115414 A1 * | 6/2003 | Tomita | ............... | G06F 11/1458 |
| | | | | 711/114 |
| 2005/0030962 A1 * | 2/2005 | Hou | ......................... | H04L 49/90 |
| | | | | 370/412 |
| 2006/0036817 A1 * | 2/2006 | Oza | ......................... | G06F 9/3816 |
| | | | | 711/155 |
| 2016/0085585 A1 * | 3/2016 | Chen | ....................... | G06F 12/08 |
| | | | | 711/154 |
| 2017/0083337 A1 * | 3/2017 | Burger | ..................... | G06F 9/268 |

OTHER PUBLICATIONS

"Improving Direct-Mapped Cache Performance by the Addition of a Small Fully-Associative Cache and Prefetch Buffers" by Norman P. Jouppi, The 17th Annual International Symposium on Compui'er Architecture, pp. 364-373, May 1990.*

* cited by examiner

*Primary Examiner* — Jing-Yih Shyu
(74) *Attorney, Agent, or Firm* — Mintz Levin Cohn Ferris Glovsky and Popeo, P.C.

(57) ABSTRACT

A system, a method, and computer program product for performing buffering operations. A data update is received at a buffering location. The buffering location includes a first buffer portion and a second buffer portion. The data update includes an address tag. The buffering location is communicatively coupled to a memory location configured to receive the data update. A target address of the data update in the memory location is determined using the first buffer portion and compared to the address tag. The data update is applied using the first buffer portion to update data in the first buffer portion upon determination that the target address matches the address tag. The target address of the data update is pre-fetched from the memory location upon determination that the target address does not match the address tag. The first and second buffer portions buffer the data update using the pre-fetched target address.

16 Claims, 16 Drawing Sheets

BUFFERING OF ASSOCIATIVE OPERATIONS ON RANDOM MEMORY ADDRESSES

TECHNICAL FIELD

This disclosure relates generally to data processing and, in particular, to buffering of operations on random memory addresses.

BACKGROUND

Atomics are one of the fundamental synchronization techniques in modern multicore central processing units (CPUs). These operations update a memory location such that the operation appears indivisible. The x86 instruction set architecture (ISA) provides two types of atomics—direct-fetch and compare-and-swap (CAS). Fetch-atomics apply an indivisible update directly on a memory address, but they are only defined for integer values and a limited set of update operations. CAS can be applied to various data types and support a variety of update operations. To achieve this, the CAS operation loads a memory address, updates the value and writes this result to the memory address, if the value at the memory address has not been changed in the meantime. If the value has been changed, the CAS operation has to retry. In contrast, a fetch-atomic locks the cache line that will be updated during the complete update from the first load until the result is written to the memory.

In a multi-threaded environment with a single shared address space not only the atomicity of updates is important, but also the order in which they become visible to other threads. Thus, programming languages like C++ provide options to specify in which order atomics can become visible and how they can be reordered. ISAs provide ordering guarantees or mechanisms (e.g., fences) to implement the desired memory ordering. The guarantees made at programming language level not necessarily have to match the guarantees at ISA level, as long as the ISA guarantees are stronger. For example, X86 is restrictive as an atomic cannot be reordered with any other memory operation (loads and stores). As a consequence, even a relaxed atomic at C++ level is often executed with stronger guarantees by the architecture.

To complement automatic hardware pre-fetching, ISAs like x86 or ARMv8-A provide pre-fetch instructions to partially or completely hide memory access latency. These pre-fetch instructions can provide additional information about an optimal cache level, if there is temporal reuse, or which type of operation (read/write) will be executed.

However, in comparison to a load, a pre-fetch does not change the state of the program as it only interacts with the cache. When a thread writes to a memory address that another thread had successfully pre-fetched, but not loaded, the cache coherence protocol simply invalidates the pre-fetched entry. While load and store operations on x86 are serialized for atomics, nothing indicates that this also holds true for pre-fetches.

SUMMARY

In some implementations, the current subject matter relates to a computer implemented method for performing buffering operations. The method may include receiving a data update at a buffering location. The buffering location may include a first buffer portion and a second buffer portion. The data update may include an address tag. The buffering location may be communicatively coupled to a memory location configured to receive the data update. The method may further include determining, using the first buffer portion, a target address of the data update in the memory location and comparing the target address to the address tag, applying, using the first buffer portion, the data update to update data in the first buffer portion upon determination that the target address matches the address tag, and pre-fetching the target address of the data update from the memory location upon determination that the target address does not match the address tag, and buffering, using the first buffer and the second buffer portions, the data update using the pre-fetched target address.

In some implementations, the current subject matter may include one or more of the following optional features. The first buffer portion may be a direct mapping buffer and the second buffer portion may be a first-in, first-out buffer. Pre-fetching may include updating the memory location using the address tag and at least one entry from the first-in, first-out buffer. The entry may be a first entry in the first-in, first-out buffer. In some implementations, the method may also include removing the first entry from the first-in, first-out buffer.

In some implementations, pre-fetching may also include pre-fetching the target address from the memory location using a value corresponding to the address tag obtained from the direct mapping buffer. The method may include providing the value obtained from the direct mapping buffer to the first-in, first-out buffer. Further, the method may include buffering the value and the address corresponding to the value in the direct mapping buffer.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
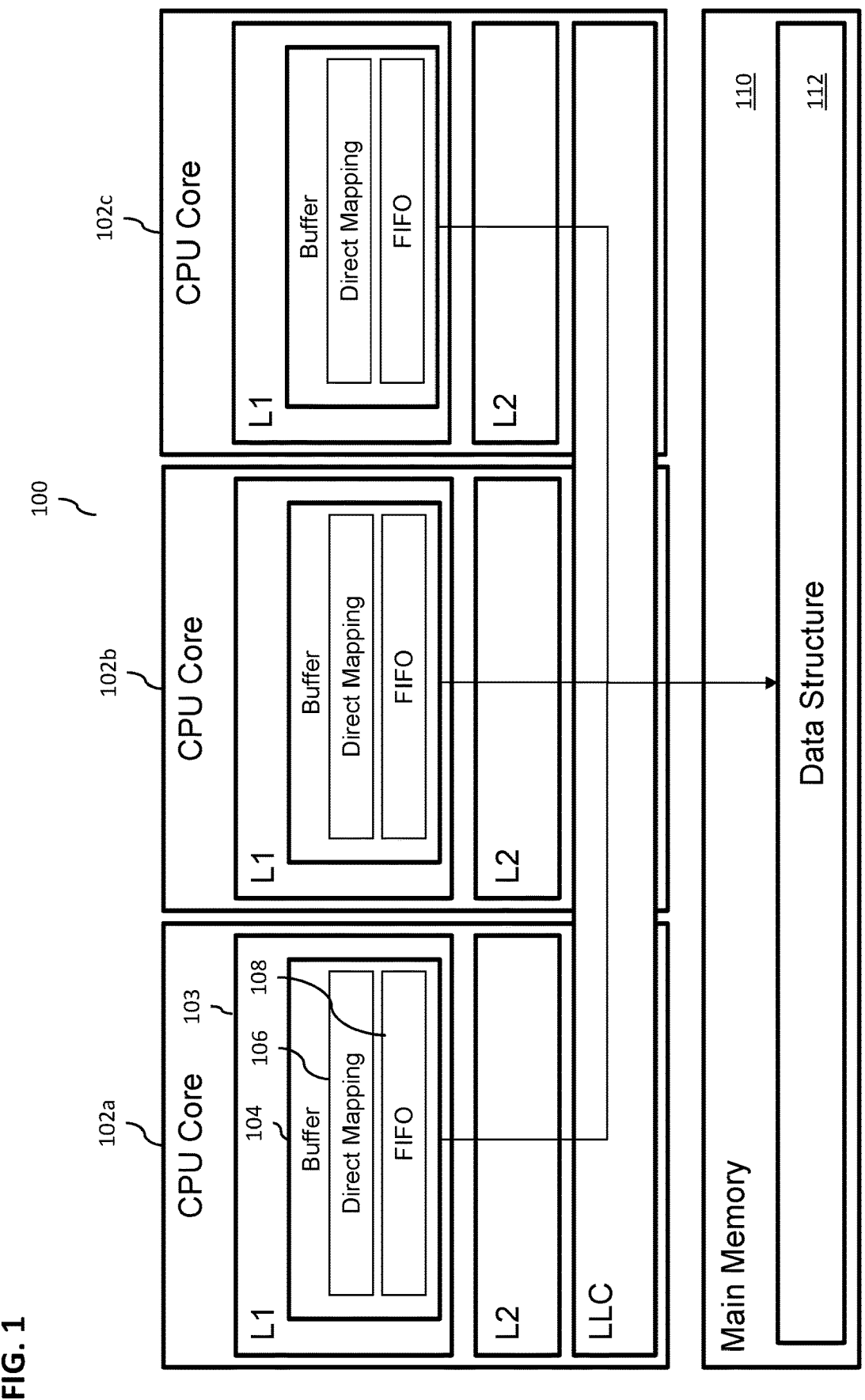
FIG. 1 illustrates an exemplary system for performing buffering, according to some implementations of the current subject matter

Modern computer systems are relying on an increase of available parallelism to achieve performance scaling, and technical constraints demand for a continuation of this trend. Besides the growing amount of homogeneous parallelism, such as instruction-level parallelism (ILP), multicore, and single instruction, multiple data (SIMD), heterogeneity also increases due to specialized architectures (e.g., general-purpose graphics processing unit (GPGPU), tensor processing unit (TPU), field-programmable gate array (FPGA)). Similarly, memory is growing in capacity and performance, albeit at a lower rate. Emerging memory technologies like storage class memory (SCM) promise to continue this trend by providing large, persistent memory. However, these improvements come with certain tradeoffs regarding memory access latency.

The pervasive use of concurrency, especially multithreading, may require efficient solutions for concurrency control. A well-known concept for this purpose are atomic operations (atomics), which allow lock-free programming. An atomic is indivisible regarding other simultaneously applied operations on the same memory address, which makes atomics particularly suitable for update operations based on a read-modify-write scheme.

Algorithms may apply update operations on a single or multiple different shared memory addresses. There are multiple algorithms that scatter updates across many memory addresses like push-based graph algorithms, histogram generation, and/or hash-based aggregation. Because of their cost and to leverage all available system capabilities, there exist dozens of parallel implementations of these algorithms. Simple parallelization schemes often rely on atomics to resolve data dependencies without the overhead of explicit locking, making atomics for these cases useful and appropriate.

However, atomics, as found in common microprocessor architectures like x86 or ARMv8-A, usually guarantee more than only mutual exclusion. In particular, they come with ordering guarantees, adhering to the memory consistency model, and are executed sequentially. Even though there are architectures like IBM POWER that support re-sortable atomics, these atomics usually lack strong progress guarantees.

As a result, atomics have to be executed in order—often even with memory fence semantics—and are blocking in the context of their originating thread. The execution order is serialized, so operations that would use low-latency cache copies might have to wait for operations on slow main memory. Similarly, the lack of strong progress guarantees can lead to many replays in high-contention scenarios. Consequently, even threads with high cache hit rates might observe a memory performance degradation, as the average memory access latency increases and the amount of memory-level parallelism deteriorates. The trends of higher parallelism, and the increasing average memory access latency due to emerging technologies like SCM, suggest that the implications of atomics on overall performance are increasing dramatically.

Pre-fetching data into a higher level of the memory hierarchy may provide latency tolerance. When all relevant addresses are already in the cache, the cost of the limited dynamic reorder capability may be reduced. The problem of using pre-fetching is that it may need to be done tens to thousands of cycles upfront before the update operation to make sure that the value is cached. However, pre-fetching may be difficult as the pre-fetching distance, i.e., the distance from pre-fetch instruction to memory operation, may be either too long or too short. Thus, it is desirable to decouple the execution of an update operation from its issue, allowing to optimize pre-fetching effectiveness.

In some implementations, the current subject matter provides an ability to overcome limitations of atomics for associative and/or commutative updates. For example, this class of operations may be commonly used in push-based graph algorithms and may be insensitive to the update order. The current subject matter may provide a series of buffering techniques for update operations to reduce memory contention and to increase memory-level parallelism using pre-fetching. Further, the current subject matter may provide reporting and analyzing applicability constraints in connection with such buffering techniques. The following provides a description of the current subject matter's buffering techniques, which may tolerate memory access latency of associative and/or commutative updates in multi-threaded environments. Additionally, various exemplary implementations of the buffering techniques are also presented below.

FIG. 1 illustrates an exemplary system 100 for performing buffering, according to some implementations of the current subject matter. The system 100 may include one or more central processing unit (CPU) cores 102 (a, b, c) communicatively coupled to a main memory 110. Each such CPU core 102 may include a buffer 104 that can be disposed in level 1 (L1) cache 103 of the memory hierarchy. The buffer 104 may include a direct mapping buffer portion 106 and a first-in, first-out buffer portion 108. The main memory 110 may include a data structure 112. The data structure 112 may be a local memory structure and/or a global memory structure.

In some implementations, the system 100 may process various update operations. The update operations may involve use of buffering techniques that use one or both buffer portions 106 and 108. Specific operations of the buffer portions 106 and 108 in connection with such updates are described in further detail below.

Many applications like push-based graph algorithms, histogram computations, or hash-based aggregations may perform update operations that may be scattered across many memory locations. In parallel implementations, these scattered updates may often be realized using atomic operations and may cause poor performance. The following example relating to basic graph processing, provides an illustration of the issues associated with atomic operations.

For example, graphs that represent a relationship between different vertices may be represented as a simple list of edges (i.e., an edge list), where each edge is a pair of source and target vertex identifiers (IDs). Another commonly used graph representation, the compressed sparse row (CSR) data structure, may include a prefix sum of the vertex degrees, i.e., the number of incoming or outgoing edges per vertex. To construct the CSR structure from the edge list may the vertex degrees be obtained by counting the occurrence of the vertex IDs in the edge list. In parallel implementations, multiple threads may read portions of an edge list and update the counters of these vertices. This has several consequences:

- Data-driven: the counter to update is not known before the vertex ID is read from the edge list.
- Ordering: besides the update itself, the algorithm does not depend on intermediate counter values, consequently the order of updates is irrelevant.
- Atomicity: because multiple threads could try to update the same counter concurrently, these updates need to be atomic to prevent lost updates.
- Contention: as part of the atomic update, all other cache copies are invalidated. Depending on the data distribution of the edge list, some counters might be heavily updated, which causes cache contention.

Since the algorithm is memory-bound, performance may be improved by two approaches: a reduction of cache contention and by hiding memory access latency. In some implementations, the current subject matter may address these approaches using per-thread buffering techniques that involve buffer portions 106 and/or 108, shown in FIG. 1. The current subject matter's buffering techniques may use the fact that updates scattered across many addresses are often associative and commutative. The current subject matter's buffering techniques may implement use of three small buffer techniques (i.e., direct mapping buffer, a FIFO buffer, a combination of both), and thread-local, fully replicated data structures.

In some implementations, the direct mapping buffer 106, a FIFO buffer 108, and a buffer that combines the buffers 106, 108 may have common properties. For example, every thread may have its own local, isolated buffer, i.e., within the buffer no synchronizing operations may be required. Synchronization operations may become necessary when an (update) entry is evicted from the buffer and applied to memory.

Figure 2A:
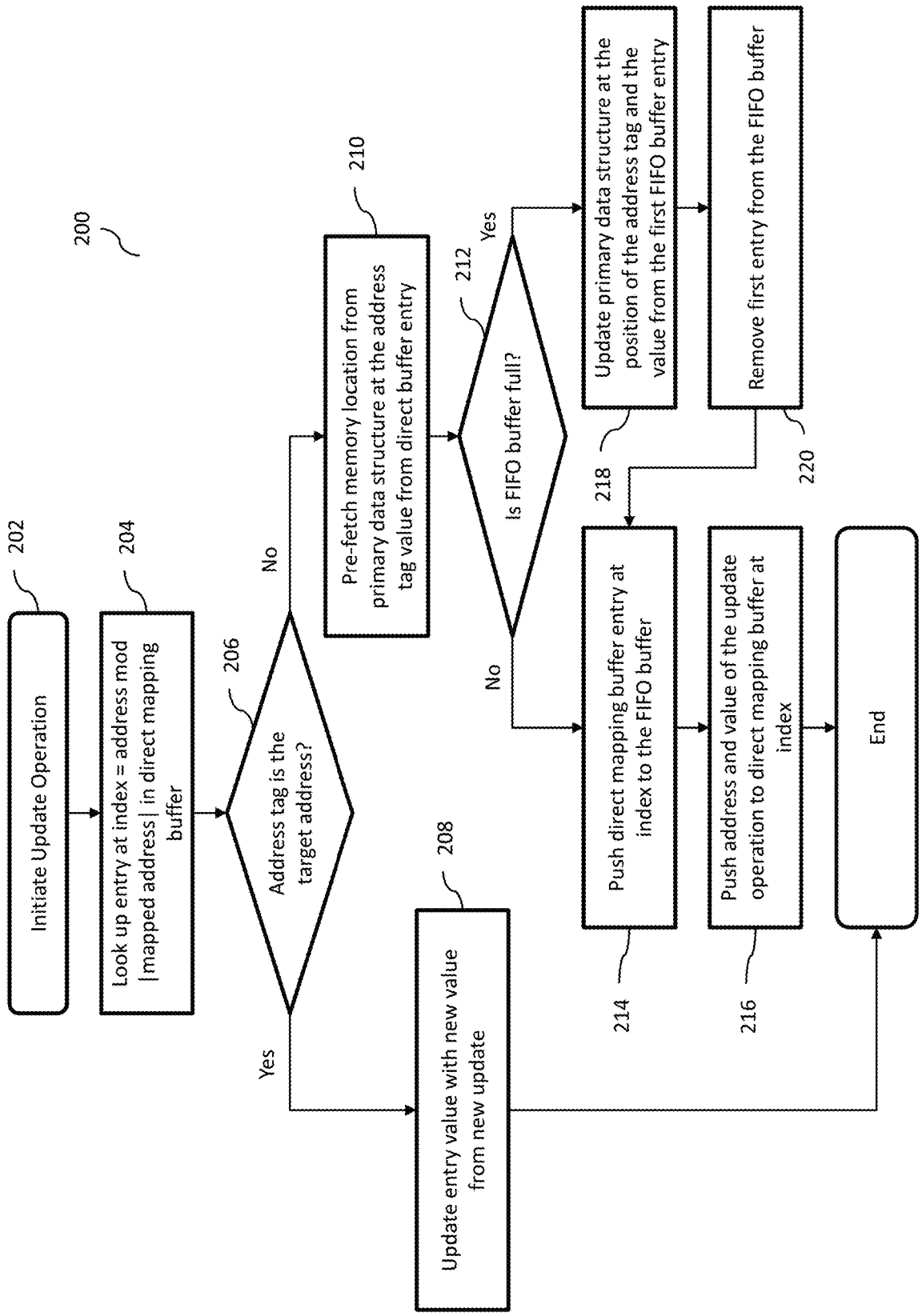
FIGS. 2a-b illustrate an exemplary update operation implementing a combined buffer (i.e., a direct mapping buffer and a FIFO buffer), according to some implementation of the current subject matter.
Figure 2B:
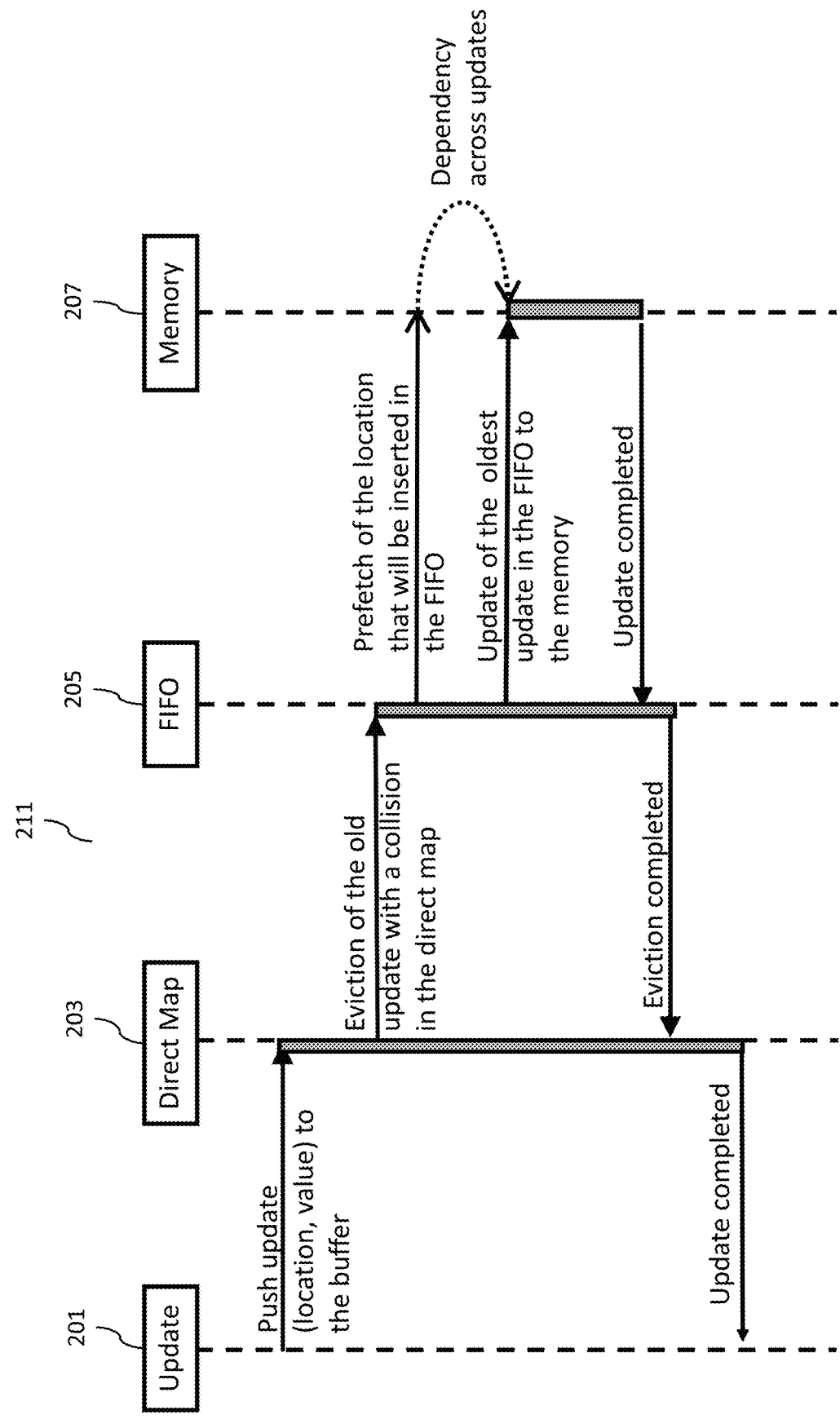
Figure 3A:
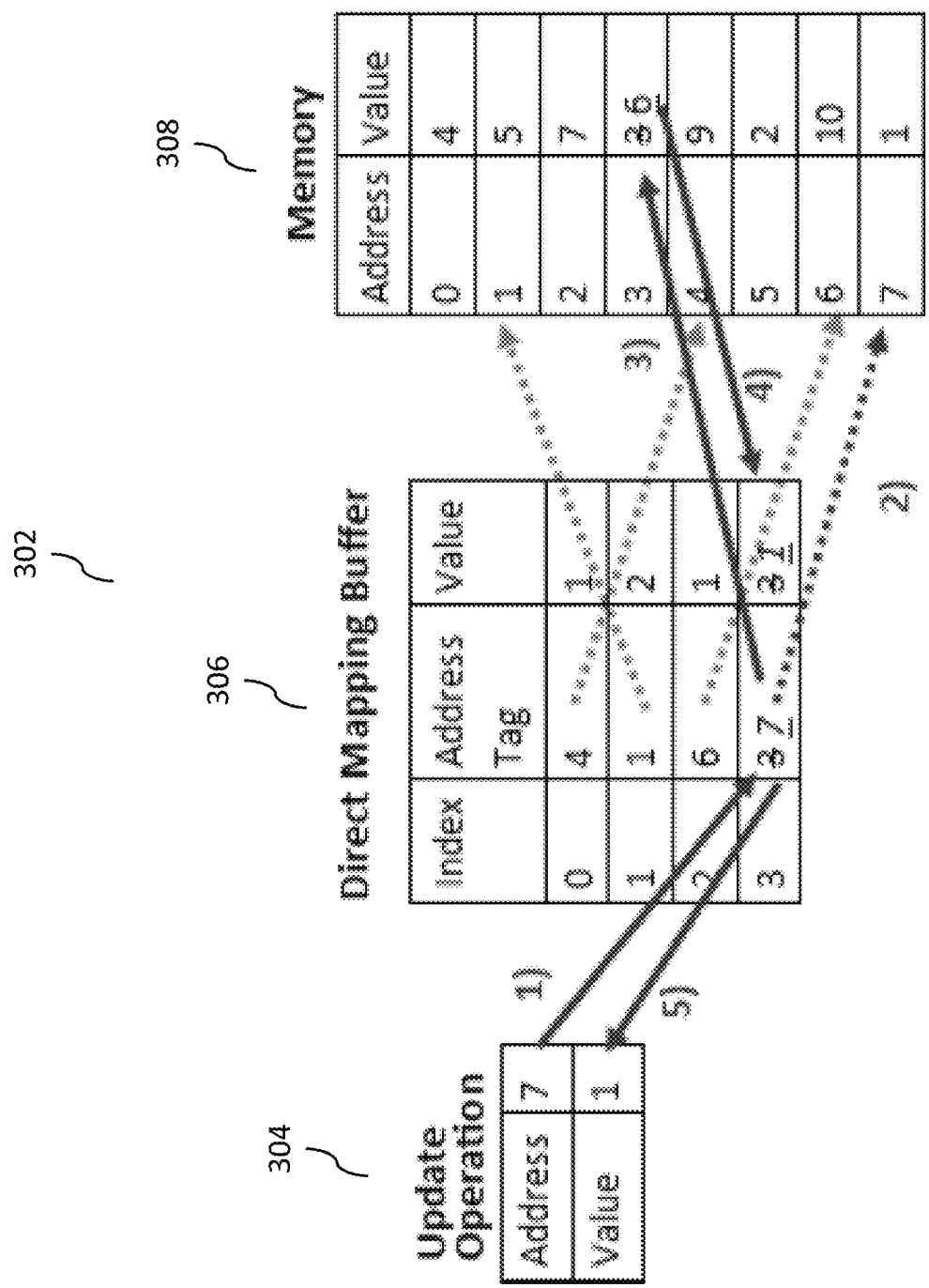
FIG. 3a illustrates an exemplary operation of the direct mapping buffer, according to some implementation of the current subject matter.
Figure 3B:
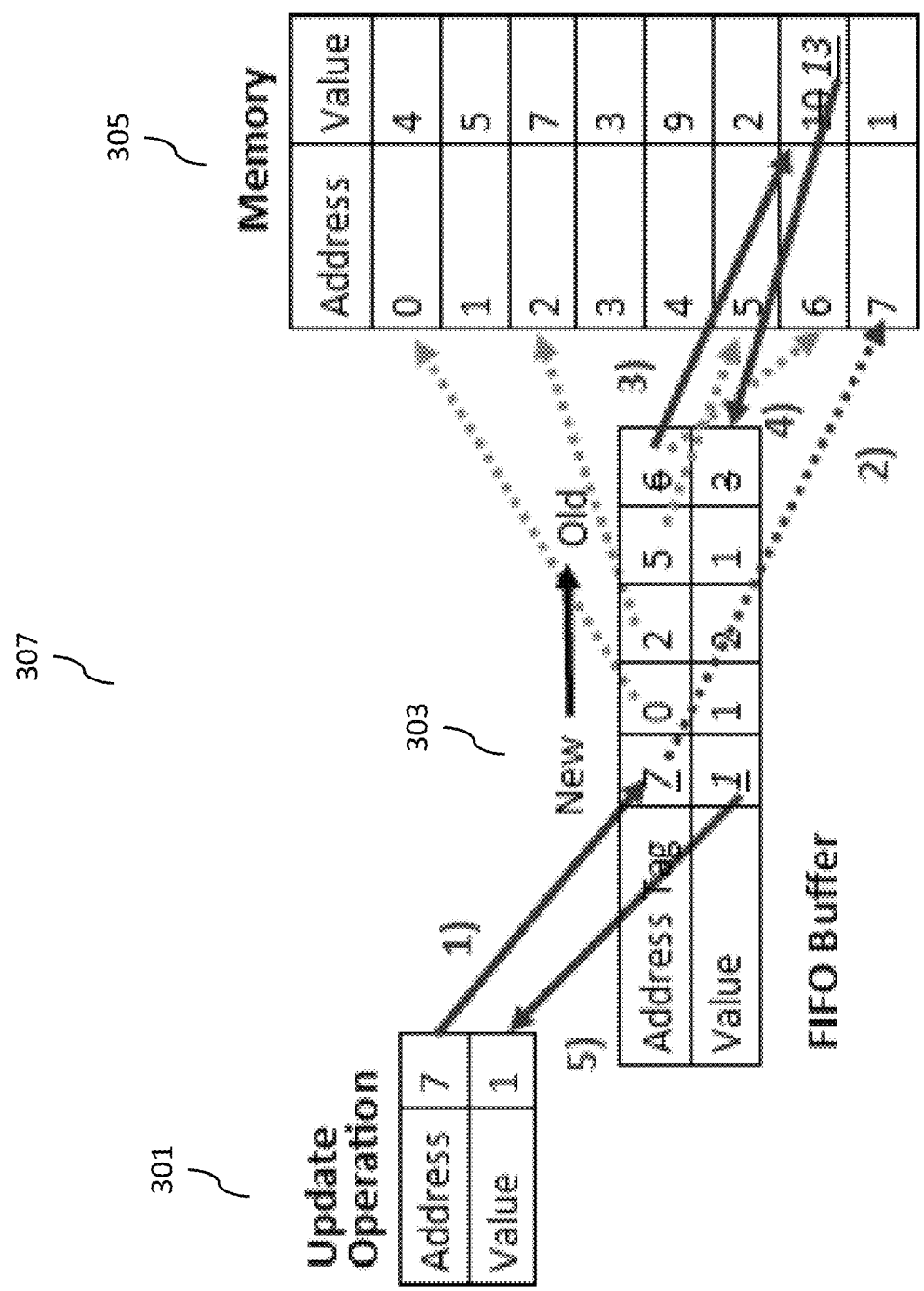
FIG. 3b illustrates an exemplary operation of the FIFO buffer, according to some implementation of the current subject matter.
Figure 4A:
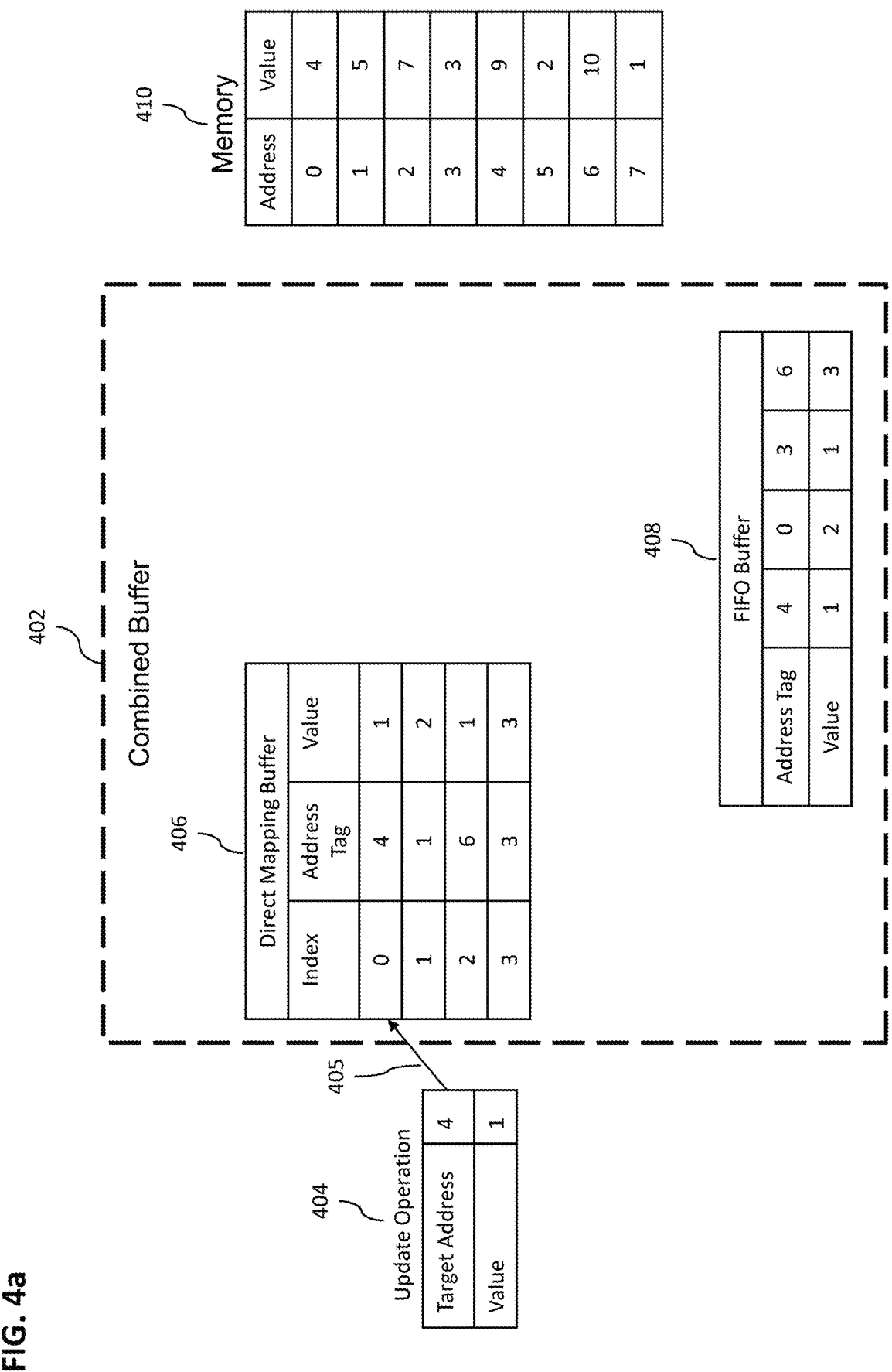
FIGS. 4a-c illustrate a "cache hit" operation of the combined buffer described in connection with FIGS. 2a-b, according to some implementation of the current subject matter.
Figure 4B:
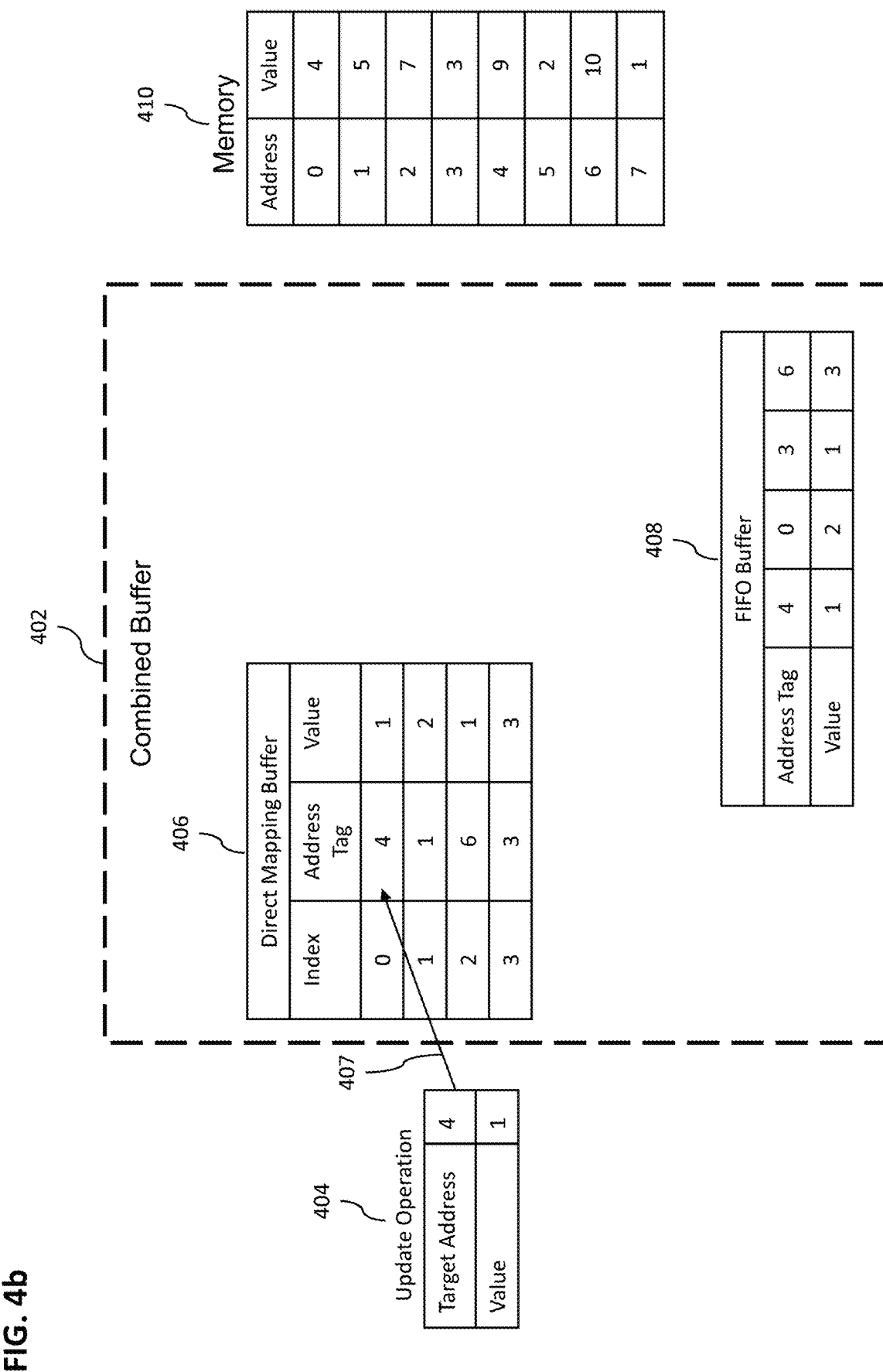
Figure 4C:
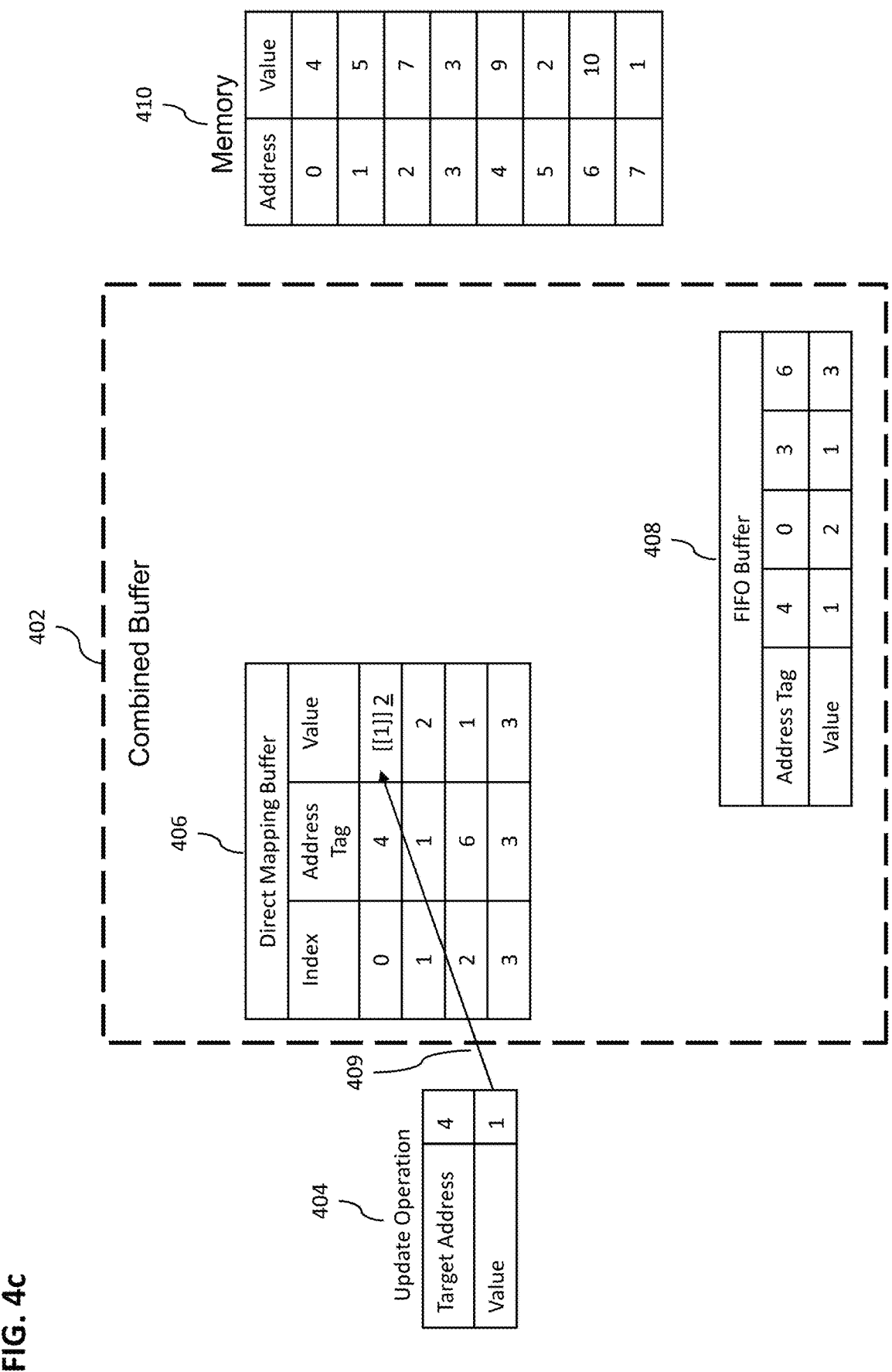
Figure 5A:
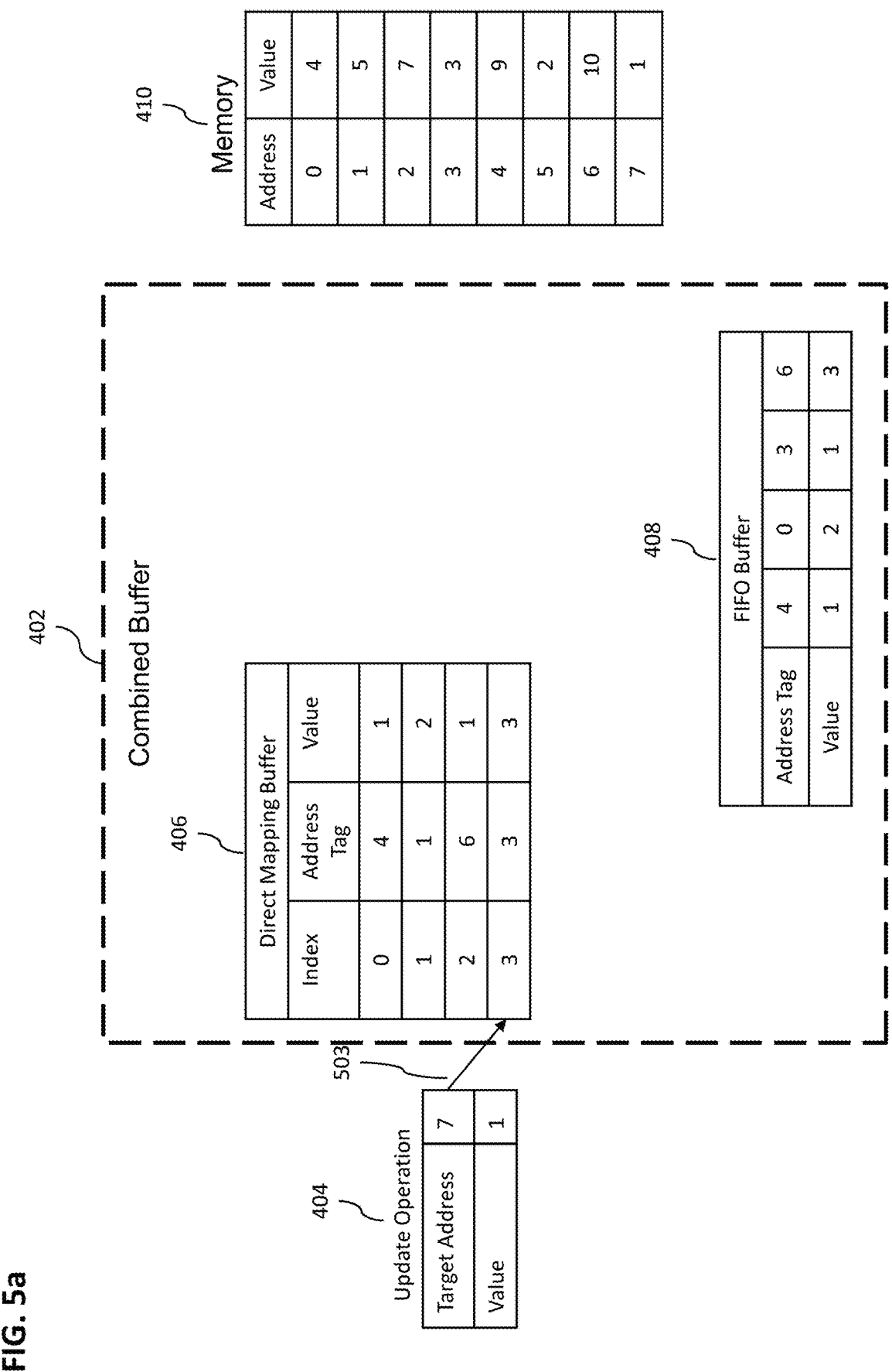
FIGS. 5a-f illustrate a "cache miss" operation using the combined buffer, according to some implementations of the current subject matter
Figure 5B:
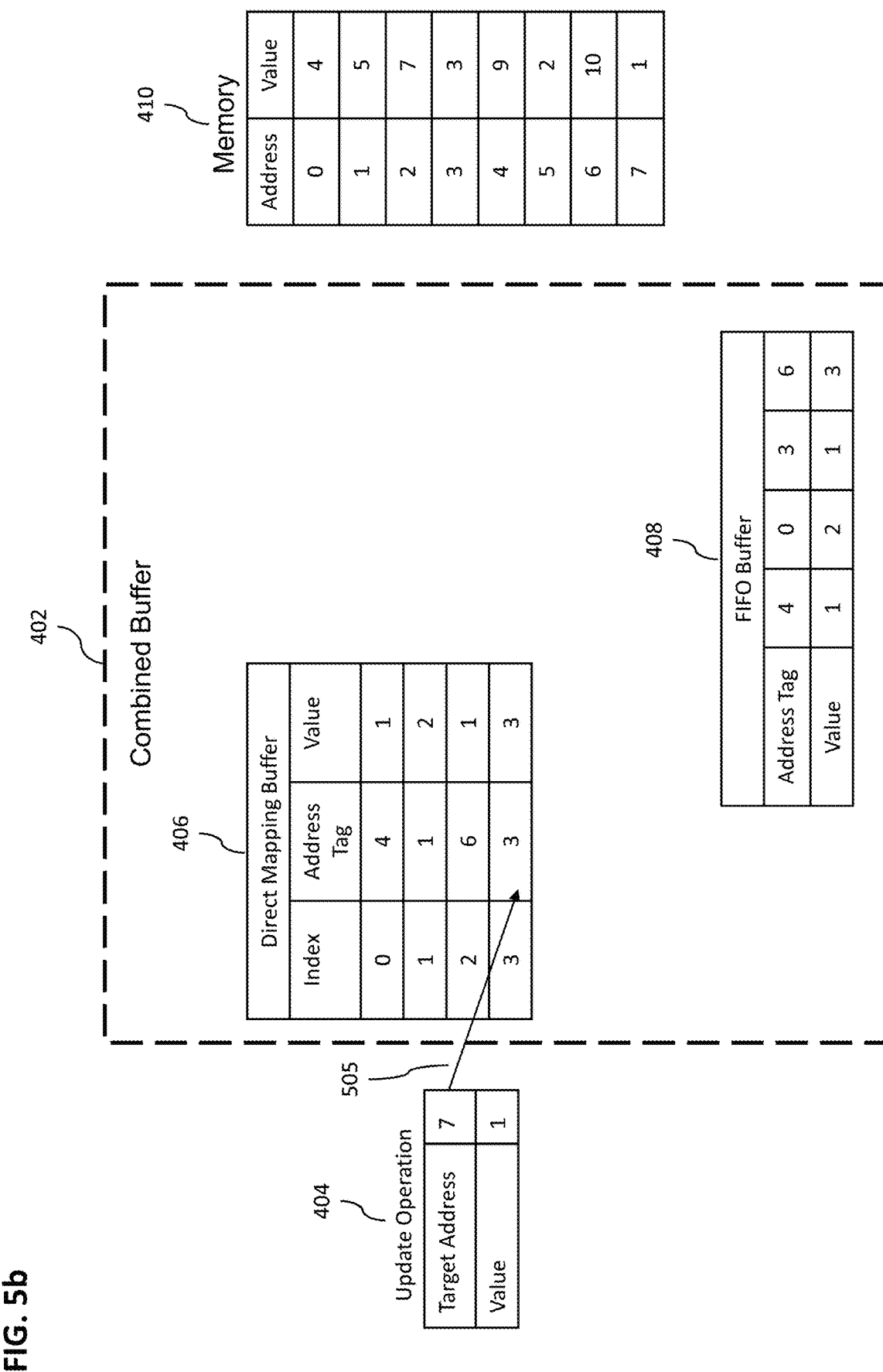
Figure 5C:
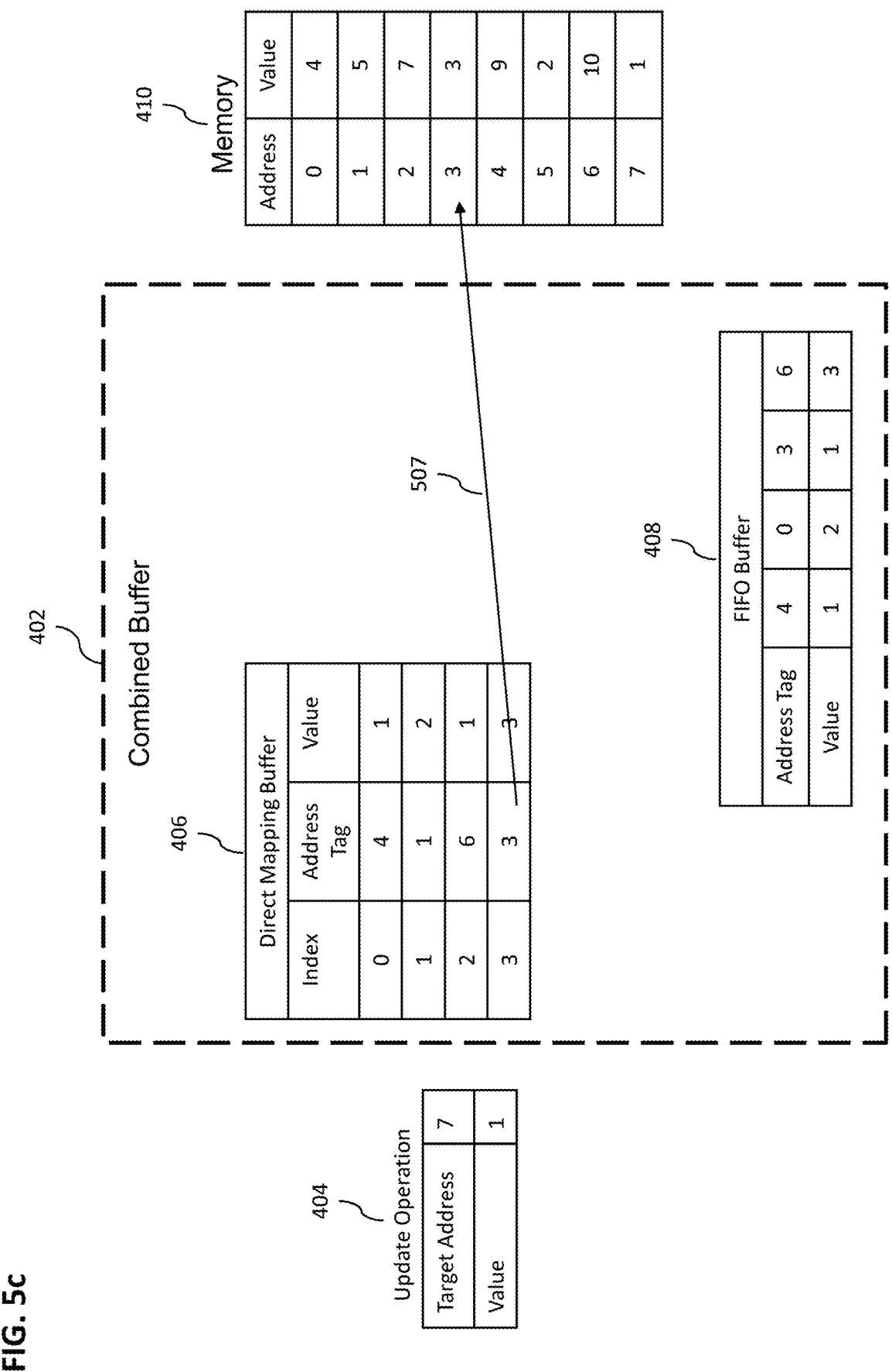
Figure 5D:
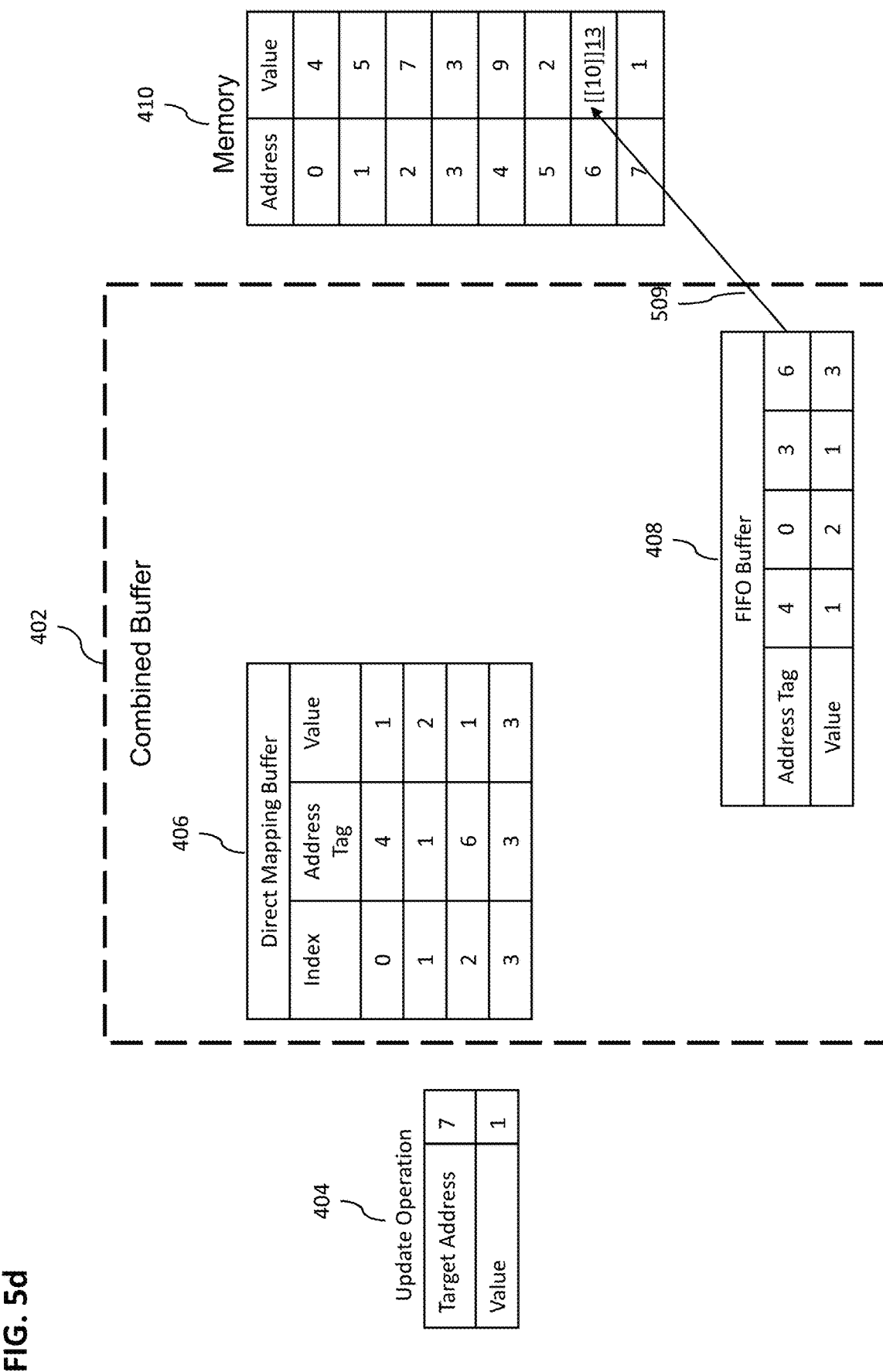
Figure 5E:
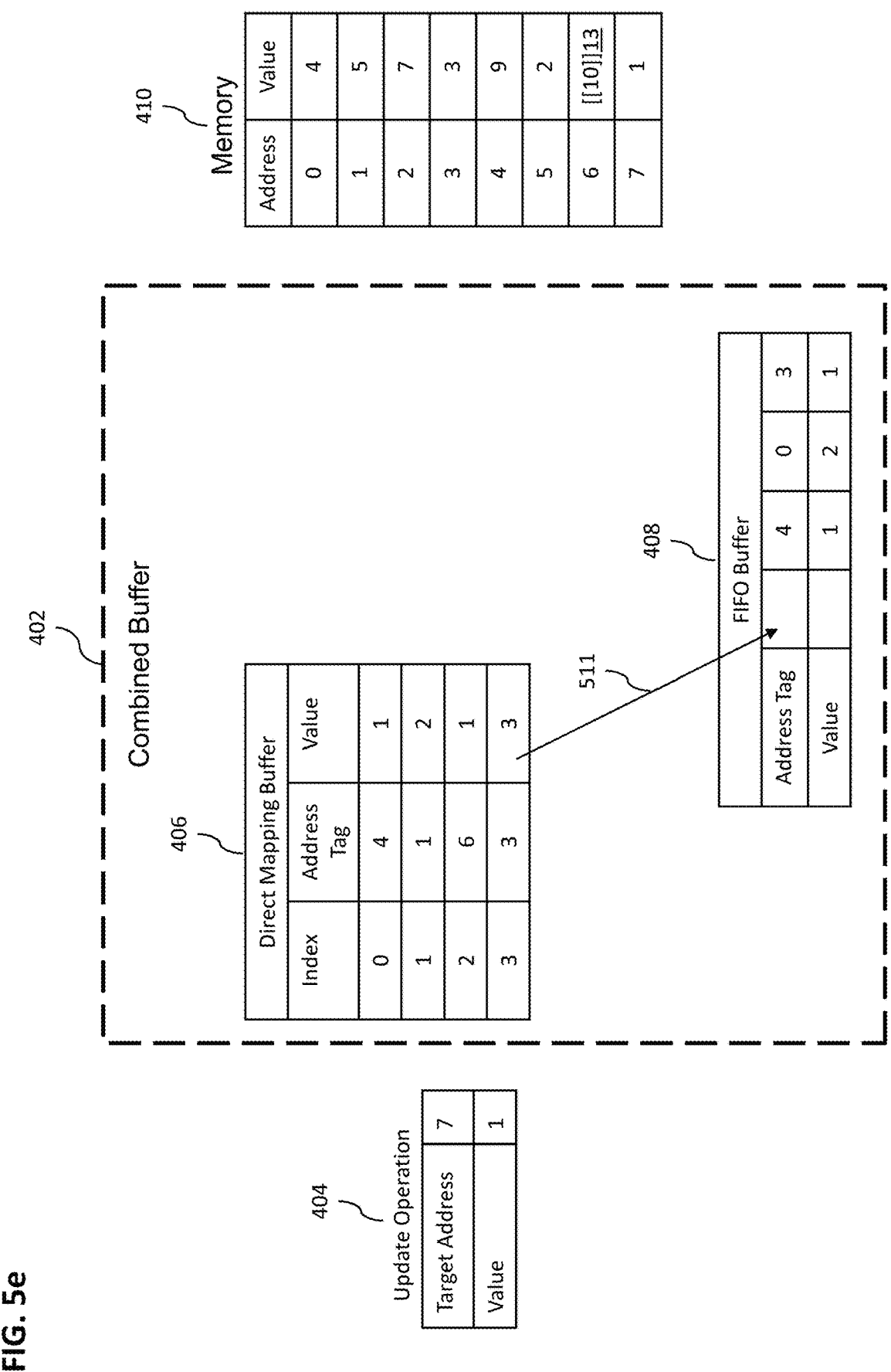
Figure 5F:
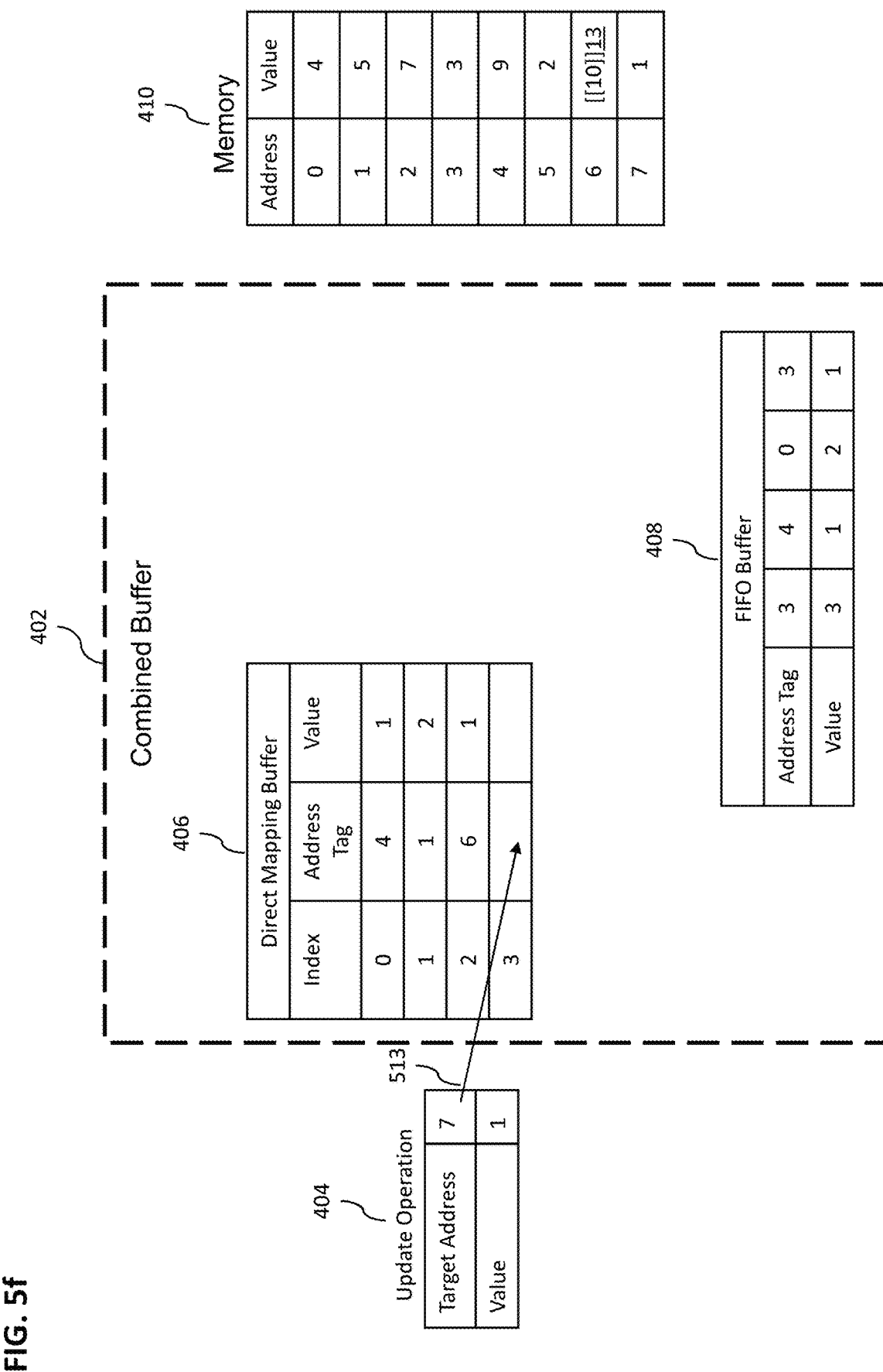

FIG. 3a illustrates an exemplary operation of the direct mapping buffer 106. FIG. 3b illustrates an exemplary operation of the FIFO buffer 108. FIGS. 2a-2b and FIGS. 4a-c, 5a-f illustrate operations of a combined buffer that includes the direct mapping buffer 106 and the FIFO buffer 108. In particular, FIGS. 4a-c illustrate a "cache hit" operation of the combined buffer and FIGS. 5a-f illustrate a "cache miss" operation of the combined buffer.

Direct Mapping Buffer

FIG. 3a illustrates an exemplary operation 302 of the direct mapping buffer 306 (similar to the direct mapping buffer 106 shown in FIG. 1) during an update operation 304, where updated values are provided to a memory location 308 (similar to the main memory 110 shown in FIG. 1). The update operation 304 may include a particular value "1" corresponding to a specific address "7". The direct mapping buffer 306 may be organized by a virtual index (corresponding to a position of an entry), address tag and corresponding values.

One of the purposes of the direct mapping buffer 306 may be to combine updates on frequently used memory addresses. It may have various similarities with a hardware cache: to access buffered values fast, a function may map every memory address of the buffered data structure to an index of an entry in the buffer. The mapping function may be selected arbitrarily but should be efficiently computable. To distinguish to which address a buffer entry maps, the buffer may internally store an address tag in addition to the buffered value for each entry.

In case of an update operation 304, the buffer 306 may check if it already contains a copy of this memory location by applying a mapping function and checking if the address tags match (as shown in FIG. 3a solid arrow operation "1)"). If true, the update is applied to the entry value. If false and this entry is used, the old entry is evicted (i.e., removed) and replaced (as shown in FIG. 3a, solid arrows operations "3)" and "4)"). If there are no updates anymore, the buffer 306 may be flushed and all entries may be evicted.

The direct mapping buffer may be a cache with an associativity of 1. In some implementations, it may be possible to use a higher associativity and/or to buffer multiple values per entry. A higher associativity may require more address comparisons for every access and a more complex eviction strategy to decide which entry to replace per index similar but not limited to strategies of multi-associative hardware caches. Thus, a possible performance improvement may be easily offset by an increased instruction overhead.

Referring back to FIG. 3a, the direct mapping buffer 306 may also be combined with pre-fetching (as shown in FIG. 3a, dotted arrow operation "2)"). A pre-fetch instruction may be generated when a new entry is inserted into the direct mapping buffer 306. When later an entry is evicted from the buffer and its update applied to memory, the probability of a "cache hit" may be increased.

FIFO Buffer

FIG. 3b illustrates an exemplary update operation 307 using FIFO buffer 303 (similar to FIFO buffer 108 shown in FIG. 1), according to some implementations of the current subject matter. An update 301 may be generated and may include an update to a particular address/value combination. The FIFO buffer 303 may defer update operations on a shared, memory-resident data structure 305, such that multiple updates on the same location may be combined and corresponding address(es) may be pre-fetched. As shown in FIG. 3b, new updates may inserted at the end (e.g., solid arrows operations "1)" and "5)" shown in FIG. 3b), while old updates at the front of the buffer 303 may be applied to the buffered data structure 305 (e.g., solid arrows operations "3)" and "4)"). This may allow pre-fetching memory addresses (e.g., doted arrow operation "2)") such that the deferred update will likely result in a "cache hit".

Since all updates may be associative, late combining in the FIFO buffer may be used to combine multiple updates to the same location into one single update. During insert, the already existing entry may be updated instead of inserting a new entry. This may reduce the buffer contention, and as a result, entries may remain longer in the buffer and increase the probability of additional combining.

Combined Buffer

FIGS. 2a-b illustrate an exemplary update operation implementing a combined buffer (i.e., a direct mapping buffer and a FIFO buffer), according to some implementation of the current subject matter. Referring to FIG. 2a, an update operation (e.g., update operation 201 shown in FIG. 2b) may be initiated, at 202. At 204, a direct mapping buffer (e.g., direct mapping buffer 203 shown in FIG. 2b) may be accessed to determine a particular entry at an index that may require an update. For example, the entry can be looked up using the following: index=address mod|direct mapping buffer) in the direct mapping buffer 203, shown in FIG. 2b. At 206, a determination may be made whether the address tag in the update is the currently buffered value where update is to be applied. If so, entry value may be updated with new value from the update, at 208.

If the address tag in the update is not the target address, at 206, a memory location (from memory 207 shown in FIG. 2b) may be pre-fetched, where the memory location corresponds to the address tag value from the direct buffer entry, at 210. At 212, a determination may be made whether the FIFO buffer (e.g., FIFO buffer 205 shown in FIG. 2b) is full. If so, the primary data structure (i.e., memory 207) may be updated using the position of the address tag and the value from the first FIFO buffer entry, at 218. Then, the processing may proceed to remove/evict first entry(s) from the FIFO buffer, at 220. The processing then proceeds to 214 where direct mapping buffer entry at the index is pushed to the FIFO buffer.

If the FIFO buffer is not full, at 212, the direct mapping buffer entry at the index in the update may be pushed to the FIFO buffer 205, at 214. Then, the address and value of the update operation may be pushed to the direct mapping buffer at the index of the update, at 216.

The combined buffering technique may combine the advantages of both buffering techniques. The direct mapping buffer may combine updates on often-used addresses to reduce contention, while the FIFO buffer may hide latency using pre-fetches. Even though the main purpose of the direct mapping buffer is to combine updates, the FIFO buffer serves as an extension of the (limited) associativity for often-used indices.

FIGS. 4a-c illustrate a "cache hit" operation of the combined buffer described in connection with FIGS. 2a-b. As shown in FIGS. 4a-c, an update operation 404 having a specific target address and value combination is received for update to the main memory structure 410 and a combined buffer 402 (including the direct mapping buffer 406 and a FIFO buffer 408) may be accessed for buffering/pre-fetching purposes. Initially, the update operation 404 accesses direct mapping buffer 406, at 405 (shown in FIG. 4a). Upon determination that there is a "cache hit" (i.e., a match in the address tag at the direct mapping buffer 406), at 407 (shown in FIG. 4b), the value in the direct mapping buffer 406 may be updated with the new value, at 409 (shown in FIG. 4c).

FIGS. 5a-f illustrate a "cache miss" operation using the combined buffer, according to some implementations of the current subject matter. An update may be pushed to the direct mapping buffer, at 503 (shown in FIG. 5a). A determination may be made that target address of the update does not match the address tag in the direct mapping buffer, at 505 (shown in FIG. 5b). An old update may be evicted from the direct mapping buffer and a location that may be inserted in the FIFO buffer may be pre-fetched from the main memory 410 to prepare for future eviction, at 507 (shown in FIG. 5c). An update to the main memory may be performed, at 509 (shown in FIG. 5d). A new entry may be moved into the FIFO buffer 408, at 511 (shown in FIG. 5e). The eviction/removal of the entries may be completed along with the update process, at 513 (shown in FIG. 5f).

Thread-Local Fully Replicated Data Structures

In some exemplary implementations, for associative and commutative update operations, the main alternative to use of small local buffers (as discussed above) may be to use fully replicated data structures, which may replicate the target data structure on a per-thread basis. By using fully replicated data structures, all updates may be applied to the local copy without the need of synchronization. When a globally consistent state is required, all thread-local copies may be merged. As a result, fully replicated data structures may avoid use of synchronization, in particular atomics, as updates on replicated structures do not result in data dependencies. Non-atomic updates may be typically less compute-intensive than their atomic counterparts as they may provide no mutual exclusion or ordering guarantees, which may allow reordering and speculative execution. This approach may improve cache usage as other threads will not invalidate cached entries. This may also be applicable to small buffers.

One of the main objectives of the realization of software buffering may be an efficient implementation with low overhead, as otherwise performance gains originating to reduced memory access latency may be easily exceeded by instruction overhead. In some implementations, the software buffers (FIFO, direct mapping, and/or combined) may be realized in C++ using templates to be fast and configurable. The template arguments may be used to describe statically how the buffer may be used (e.g., buffered object type, update operation) and to define parameters like eviction strategy or buffer size(s). By using templates, the processes of complex operations such as, update may be in-lined, and arithmetic operations (e.g., divisions) may be replaced with less compute-intensive equivalent operations, if applicable.

All three types of the buffer may be realized as combinations of direct mapping and FIFO as eviction strategy. A dummy write strategy may allow creating a buffer variant that may forward updates directly to memory. The direct map essentially may include two arrays, one for the address tags and one for the values. Every address may belong to a single index in the arrays, where the index may be the remainder of the address divided by the buffer size. In some exemplary implementations, the FIFO buffer may be a ring buffer that, like the direct mapping buffer, may include two arrays, one for the address tags and one for the values.

Both, the direct mapping buffer and FIFO buffers, may perform pre-fetching of addresses that will be updated. Pre-fetches may be issued when new updates are inserted into the buffer. To guarantee a global state at specific points, the buffers may use a flush method, which may evict all entries in the buffer. The flush method may be automatically triggered when a buffer gets destructed.

In some implementation, the thread-local fully replicated data structures may differ from the buffer realization as here every thread may own a complete copy of the data structure. During the main computational phase, every thread may apply updates to this local structure to generate a partial result. These partial results may be merged afterwards. In some exemplary implementations, every thread may receive an equal-sized ID range of the result vector that it may merge using the partial results from all other threads. Every thread may then compute the sum of all partial results for all its IDs and store them in the final result vector.

In some implementations, buffering may improve performance of concurrent updates. On a low-latency system, buffered approaches, such as, the combined buffer may outperform standard parallel approaches, whenever a parallel execution has an advantage over sequential execution (i.e., when the buffered data structure exceeds last-level cache size). This improvement may be present also for different types of update patterns, skewed or non-skewed, so it is also suitable for upfront unknown patterns. As this is independent of the size of the buffered data structure, the current subject matter's buffering techniques may be suited for memory-constrained environments.

In some implementations, the current subject matter's buffering techniques may eliminate updates on global data structures by local buffering and/or to reduce costs of atomic updates by pre-fetching. The buffering techniques may also tolerate higher latency.

In some implementations, as discussed above, parallel atomic update operations may be accelerated using software buffering techniques. The updates may be associative and/or commutative and may need to be spread across a range of addresses. The current subject matter's small, thread-local software buffers, where the size of such buffers may be smaller than thread-local, fully replicated data structures, and is not sensitive to the update pattern or the update rate, provide a solution to the parallel atomic update operations issues. Use of small-sized buffers may substantially improve performance, in particular for data sizes exceeding cache capacity and highly parallel executions. Additionally, use of such buffers may also tolerate an increasing memory access latency, as commonly found in multi-socket systems and/or on systems equipped with a non-volatile memory.

Figure 6:
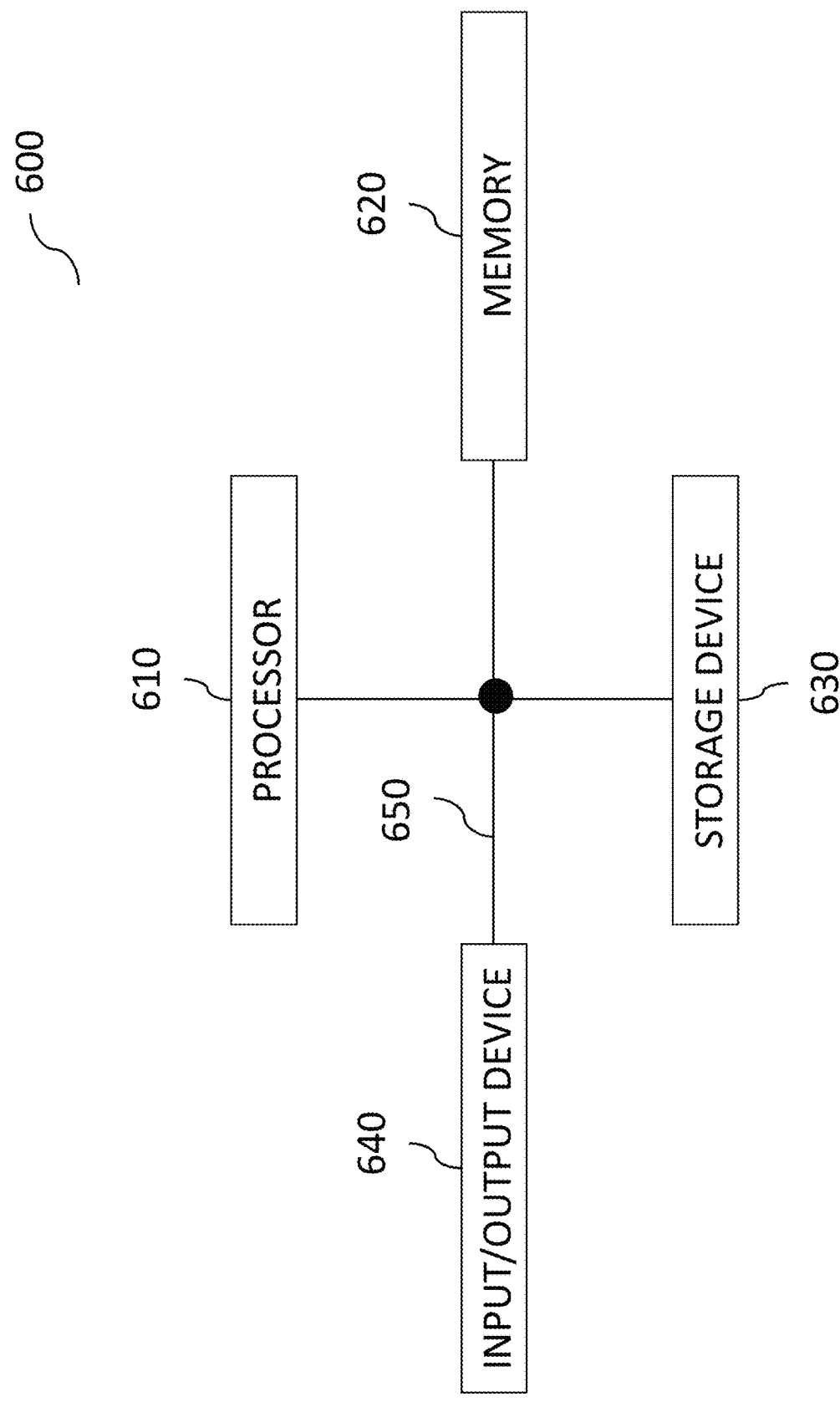
FIG. 6 is an exemplary system, according to some implementations of the current subject matter.

In some implementations, the current subject matter may be configured to be implemented in a system 600, as shown in FIG. 6. The system 600 may include a processor 610, a memory 620, a storage device 630, and an input/output device 640. Each of the components 610, 620, 630 and 640 may be interconnected using a system bus 650. The processor 610 may be configured to process instructions for execution within the system 600. In some implementations, the processor 610 may be a single-threaded processor. In alternate implementations, the processor 610 may be a multi-threaded processor. The processor 610 may be further configured to process instructions stored in the memory 620 or on the storage device 630, including receiving or sending information through the input/output device 640. The memory 620 may store information within the system 600. In some implementations, the memory 620 may be a computer-readable medium. In alternate implementations, the memory 620 may be a volatile memory unit. In yet some implementations, the memory 620 may be a non-volatile memory unit. The storage device 630 may be capable of providing mass storage for the system 600. In some implementations, the storage device 630 may be a computer-readable medium. In alternate implementations, the storage device 630 may be a floppy disk device, a hard disk device, an optical disk device, a tape device, non-volatile solid state memory, or any other type of storage device. The input/output device 640 may be configured to provide input/output operations for the system 600. In some implementations, the input/output device 640 may include a keyboard and/or pointing device. In alternate implementations, the input/output device 640 may include a display unit for displaying graphical user interfaces.

Figure 7:
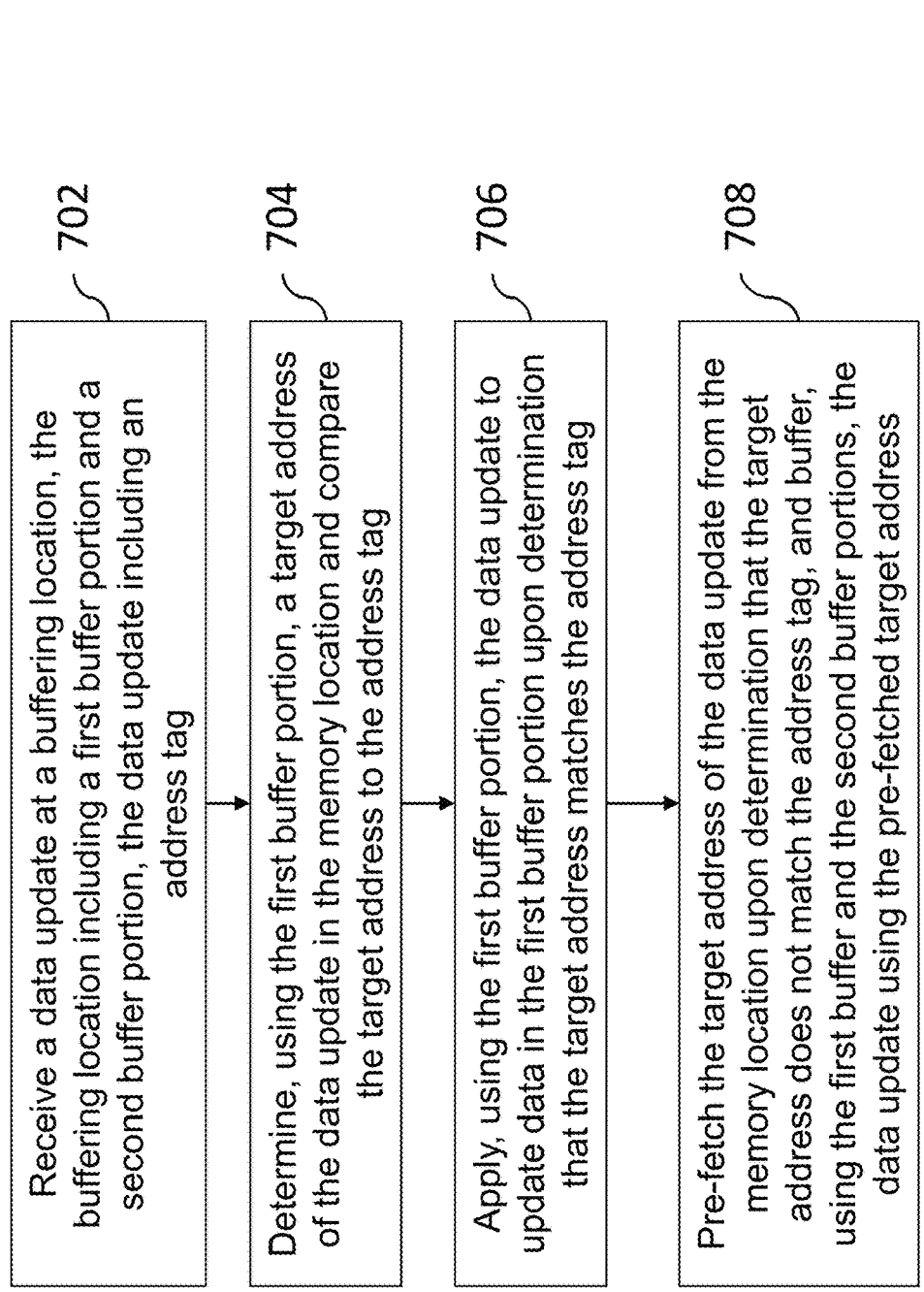
FIG. 7 is an exemplary method, according to some implementations of the current subject matter.

FIG. 7 illustrates an exemplary method 700 for performing buffering operations, according to some implementations of the current subject matter. At 702, a data update may be received at a buffering location (e.g., buffer 402). The buffering location may include a first buffer portion (e.g., buffer 406) and a second buffer portion (e.g., buffer 408). The data update may include an address tag. The buffering location may be coupled to a memory location (e.g., memory 410), which may receive the data update. At 704, a target address of the data update in the memory location may be determined using the first buffer portion and compared the target address to the address tag (as shown in FIG. 2a, at 204-206). At 706, the data update may be applied using the first buffer portion to update data in the first buffer portion upon determination that the target address matches the address tag. At 708, the target address of the data update may be pre-fetched from the memory location (as shown in FIG. 2a, at 210) upon determination that the target address does not match the address tag. The first buffer and the second buffer portions may then buffer the data update using the pre-fetched target address.

In some implementations, the current subject matter may include one or more of the following optional features. The first buffer portion may be a direct mapping buffer and the second buffer portion may be a first-in, first-out buffer. Pre-fetching may include updating the memory location using the address tag and at least one entry from the first-in, first-out buffer. The entry may be a first entry in the first-in, first-out buffer. In some implementations, the method may also include removing the first entry from the first-in, first-out buffer.

In some implementations, pre-fetching may also include pre-fetching the target address from the memory location using a value corresponding to the address tag obtained from the direct mapping buffer. The method may include providing the value obtained from the direct mapping buffer to the first-in, first-out buffer. Further, the method may include buffering the value and the address corresponding to the value in the direct mapping buffer.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
receiving a data update at a buffering location, the buffering location including a first buffer portion and a second buffer portion, the data update including an address tag, the buffering location being communicatively coupled to a memory location configured to receive the data update, the first buffer portion being a direct mapping buffer and the second buffer portion being a first-in, first-out buffer;
determining, using the first buffer portion, a target address of the data update in the memory location and comparing the target address to the address tag;
applying, using the first buffer portion, the data update to update data in the first buffer portion upon determination that the target address matches the address tag; and
pre-fetching the target address of the data update from the memory location upon determination that the target address does not match the address tag, and buffering, using the first buffer and the second buffer portions, the data update using the pre-fetched target address, wherein pre-fetching includes updating the memory location using the address tag and at least one entry from the first-in, first-out buffer.

2. The method according to claim 1, wherein the at least one entry is a first entry in the first-in, first-out buffer.

3. The method according to claim 2, further comprising removing the first entry from the first-in, first-out buffer.

4. The method according to claim 1, wherein pre-fetching further comprises pre-fetching the target address from the memory location using a value corresponding to the address tag obtained from the direct mapping buffer.

5. The method according to claim 1, further comprising providing the value obtained from the direct mapping buffer to the first-in, first-out buffer.

6. The method according to claim 5, further comprising buffering the value and the address tag corresponding to the value in the direct mapping buffer.

7. A system comprising:
at least one programmable processor; and
a non-transitory machine-readable medium storing instructions that, when executed by the at least one programmable processor, cause the at least one programmable processor to perform operations comprising:
receiving a data update at a buffering location, the buffering location including a first buffer portion and a second buffer portion, the data update including an address tag, the buffering location being communicatively coupled to a memory location configured to receive the data update, the first buffer portion being a direct mapping buffer and the second buffer portion being a first-in, first-out buffer;
determining, using the first buffer portion, a target address of the data update in the memory location and comparing the target address to the address tag;
applying, using the first buffer portion, the data update to update data in the first buffer portion upon determination that the target address matches the address tag; and pre-fetching the target address of the data update from the memory location upon determination that the target address does not match the address tag, and buffering, using the first buffer and the second buffer portions, the data update using the pre-fetched target address, wherein pre-fetching includes updating the memory location using the address tag and at least one entry from the first-in, first-out buffer.

8. The system according to claim 7, wherein the at least one entry is a first entry in the first-in, first-out buffer.

9. The system according to claim 8, wherein the operations further comprise removing the first entry from the first-in, first-out buffer.

10. The system according to claim 7, wherein pre-fetching further comprises pre-fetching the target address from the memory location using a value corresponding to the address tag obtained from the direct mapping buffer.

11. The system according to claim 10, wherein the operations further comprise providing the value obtained from the direct mapping buffer to the first-in, first-out buffer.

12. The system according to claim 11, wherein the operations further comprise buffering the value and the address tag corresponding to the value in the direct mapping buffer.

13. A computer program product comprising a non-transitory machine-readable medium storing instructions that, when executed by at least one programmable processor, cause the at least one programmable processor to perform operations comprising:
receiving a data update at a buffering location, the buffering location including a first buffer portion and a second buffer portion, the data update including an address tag, the buffering location being communicatively coupled to a memory location configured to receive the data update, the first buffer portion being a direct mapping buffer and the second buffer portion being a first-in, first-out buffer;
determining, using the first buffer portion, a target address of the data update in the memory location and comparing the target address to the address tag;
applying, using the first buffer portion, the data update to update data in the first buffer portion upon determination that the target address matches the address tag; and
pre-fetching the target address of the data update from the memory location upon determination that the target address does not match the address tag, and buffering, using the first buffer and the second buffer portions, the data update using the pre-fetched target address, wherein pre-fetching includes updating the memory location using the address tag and at least one entry from the first-in, first-out buffer.

14. The computer program product according to claim 13, wherein
the at least one entry is a first entry in the first-in, first-out buffer; and
wherein the operations further comprise removing the first entry from the first-in, first-out buffer.

15. The computer program product according to claim 14, wherein pre-fetching further comprises pre-fetching the target address from the memory location using a value corresponding to the address tag obtained from the direct mapping buffer.

16. The computer program product according to claim 15, wherein the operations further comprise
providing the value obtained from the direct mapping buffer to the first-in, first-out buffer; and
buffering the value and the address tag corresponding to the value in the direct mapping buffer.

* * * * *